(12) United States Patent
Nickell et al.

(10) Patent No.: US 8,893,001 B2
(45) Date of Patent: *Nov. 18, 2014

(54) STRONG PASSWORD ENTRY

(71) Applicant: Red Hat, Inc., Raleigh, NC (US)

(72) Inventors: Seth Nickell, Cambridge, MA (US); Bryan W. Clark, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,112

(22) Filed: Sep. 25, 2013

(65) Prior Publication Data

US 2014/0026211 A1     Jan. 23, 2014

Related U.S. Application Data

(63) Continuation of application No. 11/171,452, filed on Jul. 1, 2005, now Pat. No. 8,560,860.

(51) Int. Cl.
| | | |
|---|---|---|
| *G06F 3/00* | (2006.01) | |
| *G06F 3/048* | (2013.01) | |
| *G06F 17/00* | (2006.01) | |
| *H04L 29/06* | (2006.01) | |
| *G06F 21/00* | (2013.01) | |
| *G06F 21/46* | (2013.01) | |

(52) U.S. Cl.
CPC ...................................... *G06F 21/46* (2013.01)

USPC ................ 715/708; 715/780; 726/1; 713/183

(58) Field of Classification Search
None
See application file for complete search history.

(56) References Cited

U.S. PATENT DOCUMENTS

| | | | |
|---|---|---|---|
| 6,026,491 A | 2/2000 | Hiles | |
| 6,643,784 B1 | 11/2003 | McCulligh | |
| 7,299,359 B2 * | 11/2007 | Hurley | ........................... 713/182 |
| 2003/0097357 A1 | 5/2003 | Ferrari et al. | |
| 2004/0073815 A1 | 4/2004 | Sanai et al. | |
| 2004/0250139 A1 | 12/2004 | Hurley | |
| 2004/0250141 A1 | 12/2004 | Casco-Arias et al. | |
| 2005/0010785 A1 | 1/2005 | Abe et al. | |
| 2005/0071686 A1 * | 3/2005 | Bagga et al. | ................... 713/202 |
| 2007/0006279 A1 * | 1/2007 | Brown et al. | ...................... 726/1 |
| 2007/0006301 A1 | 1/2007 | Nickell et al. | |

* cited by examiner

*Primary Examiner* — Stephen Alvesteffer

(74) *Attorney, Agent, or Firm* — Lowenstein Sandler LLP

(57) ABSTRACT

A processor executing a password manager randomly selects a first requirement and a second requirement for creating a password from a set of requirements, wherein the second requirement is selected independently of the first requirement. The processor provides the first requirement for creating the password, receives characters for the password, determines whether the characters satisfy the first requirement, and provides information that indicates whether the characters satisfy the first requirement. Responsive to the characters satisfying the first requirement, the processor provides the second requirement for creating the password.

20 Claims, 5 Drawing Sheets

STRONG PASSWORD ENTRY

RELATED APPLICATIONS

This patent application is a continuation application of patent application Ser. No. 11/171,452, filed Jul. 1, 2005, which is incorporated by reference herein.

TECHNICAL FIELD

The present invention relates generally to the creation of passwords. More particularly, embodiments of the present invention relate to assisting in the creation of strong passwords.

BACKGROUND

In modern computer systems, authentication techniques, such as passwords, have become very important. However, password guessing and cracking tools have also become more capable. If someone is able to guess or hack a user's password, then they may be able to gain access to sensitive information, such as personal identity information or financial information. Therefore, it is generally recommended to use strong (or complex) passwords.

A strong password typically is a certain length and may contain characters of various types. There are many types of requirements for creating strong passwords. For example, a password may be required to be at least seven characters long, contain letters, contain numerals, and contain one or more symbols. In addition, a password may be required to be significantly different from previous passwords, not contain a name, and not be a common word or name. Known systems can provide a dialog window or list of rules through a graphical user interface to indicate the minimum requirements for entering a password.

Unfortunately, users are reluctant to create strong passwords because they can be difficult to remember or create. Instead, users tend to create passwords that are based primarily on a common word, or name. Even when users attempt to create a strong password, they often structure the password so that it is easily memorable. For example, if a user is required to create a password that is seven characters long and includes at least one number. Many users will merely create a password that contains six letters and one number, such as "password1." Although stronger than a plain password, such passwords are still easily guessed.

In addition, known methods and systems often require a user to make multiple attempts at entering a password before they are able to satisfy all the applicable rules. This can be a tedious and frustrating experience for the users.

Accordingly, it may be desirable to provide methods and systems that assist users in the entry of strong passwords.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DETAILED DESCRIPTION

Embodiments of the present invention assist users with the entry of strong passwords. The password may be considered strong if it satisfies one or more requirements, such as a minimum character length. A set of these requirements may be selected and then presented to the user. The requirements may be randomly selected individually or as a group. The requirements may also be presented to the user one by one in a random order or in the form of a list with a random order. As characters for the password are entered, the user may then be notified when one or more the requirements have been satisfied.

Figure 1:
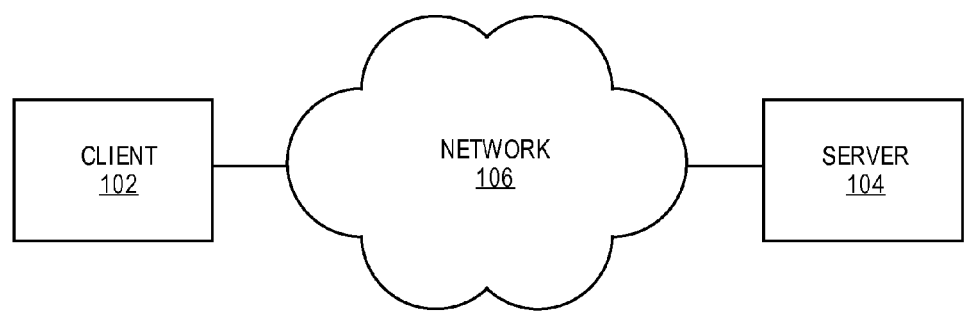
FIG. 1 illustrates a system that is consistent with the principles of the present invention.
Figure 2:
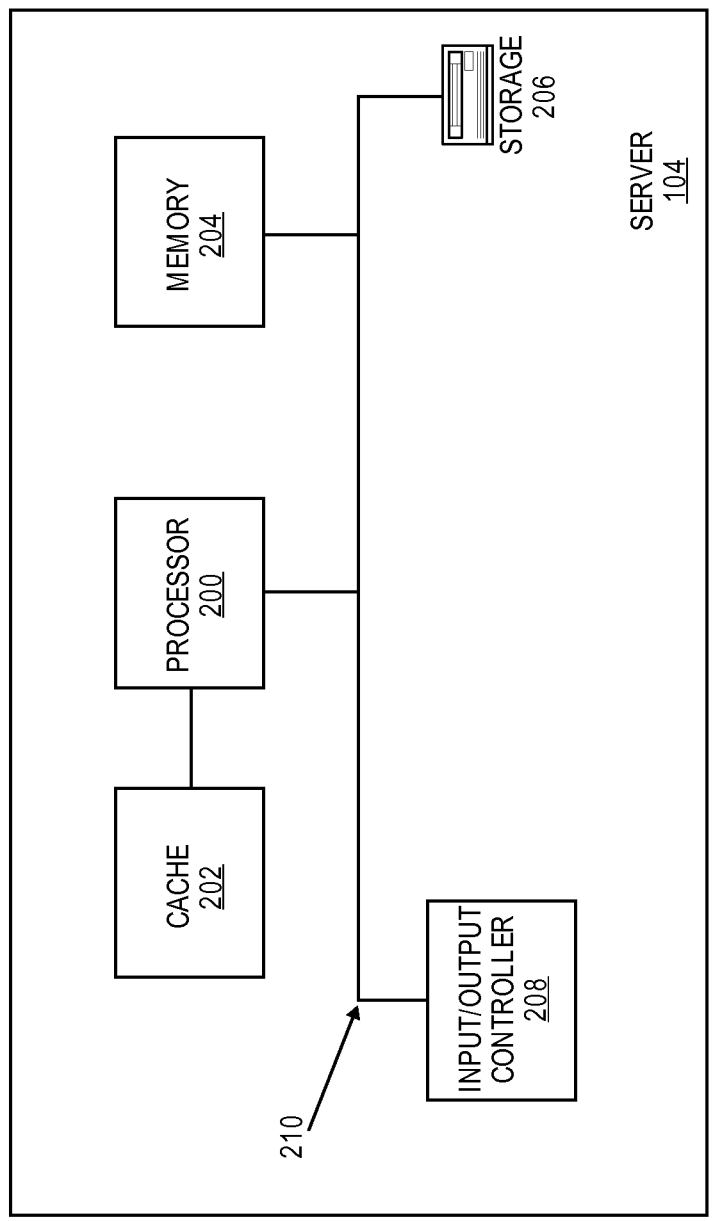
FIG. 2 illustrates a server that is consistent with the present invention.
Figure 3:
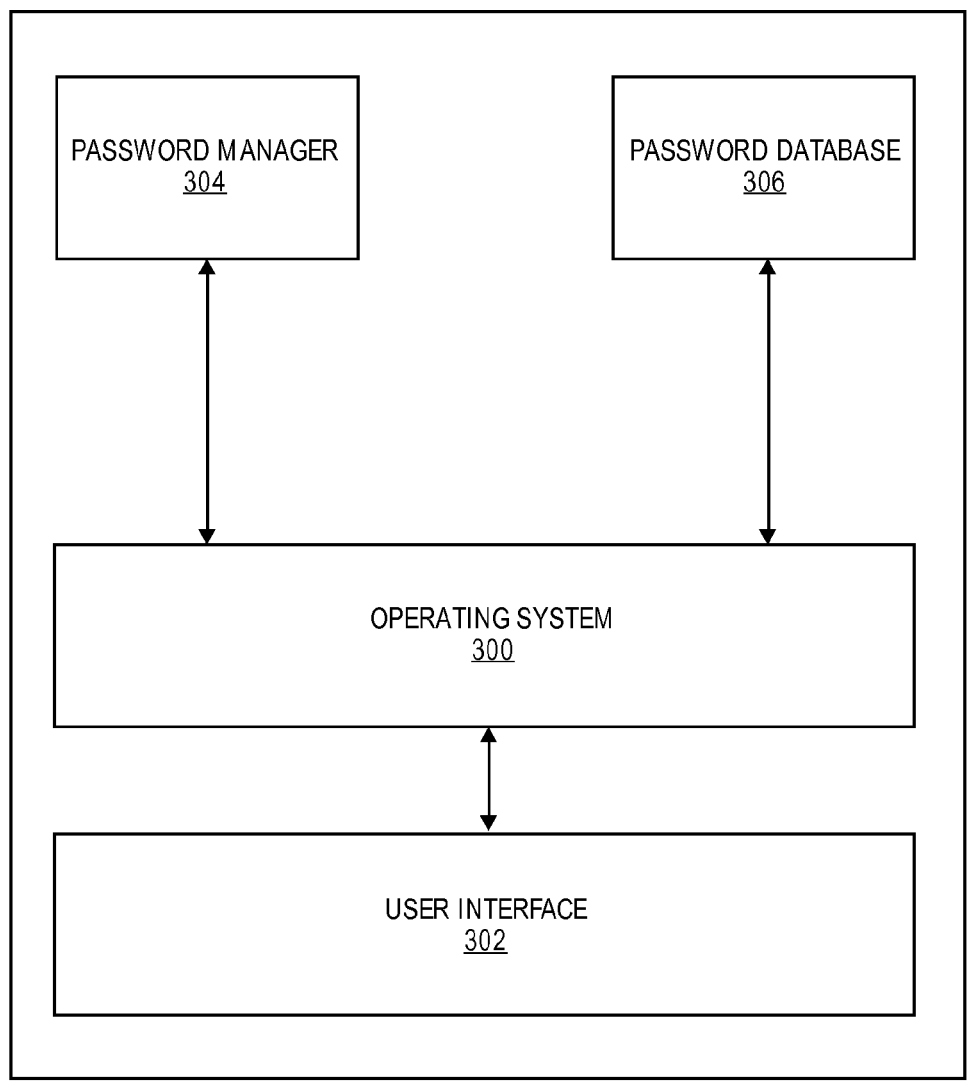
FIG. 3 illustrates an exemplary architecture for a server that is consistent with the present invention.
Figure 4:
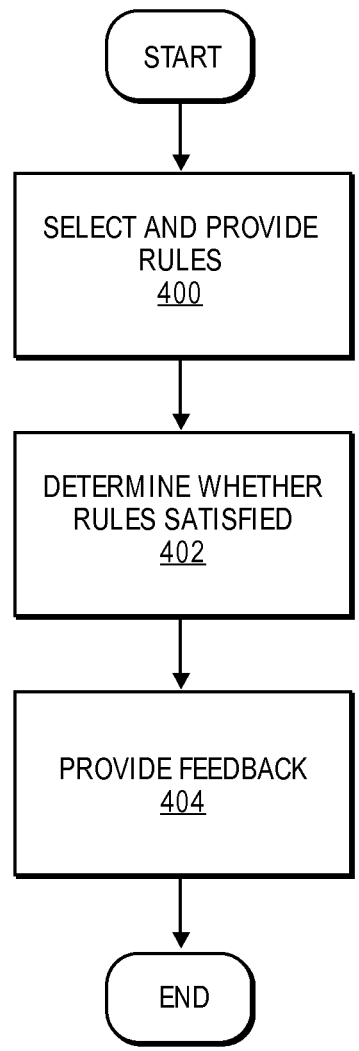
FIG. 4 illustrates an exemplary process flow that is consistent with the present invention.
Figure 5:
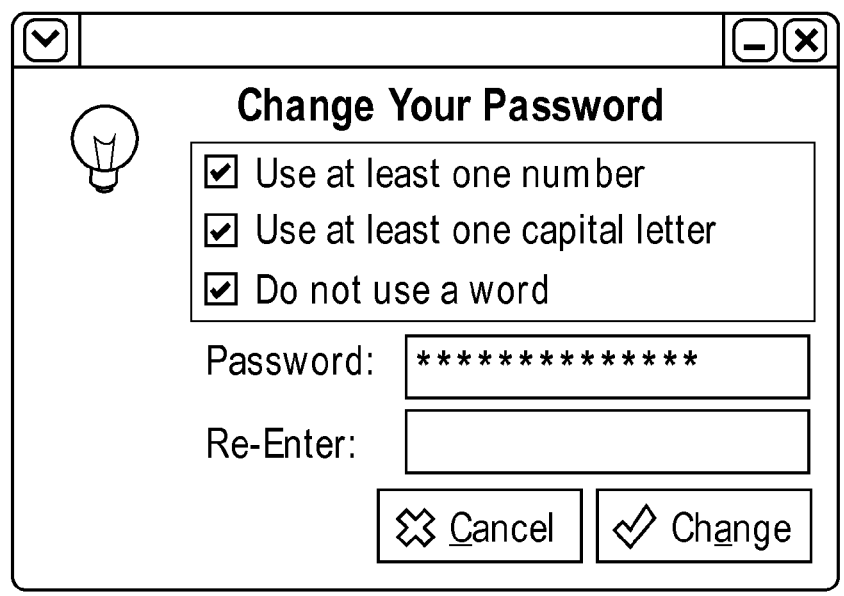
FIG. 5 shows an exemplary display screen that is consistent with the present invention.

Reference will now be made in detail to exemplary embodiments of the invention, which are illustrated in the accompanying drawings. FIGS. 1-3 illustrate various systems and components that may be used to implement embodiments of the present invention. FIGS. 4-5 illustrate a process flow and display screen that is consistent with the principles of the present invention. Wherever possible, the same reference numbers will be used throughout the drawings to refer to the same or like parts.

FIG. 1 illustrates a system 100 that is consistent with the principles of the present invention. For purposes of illustration, system 100 is shown as a typical system implemented in a network environment, such as the Internet. One skilled in the art will recognize that there many applications on the Internet that may use authentication techniques, such as a password.

As shown, system 100 may comprise a client 102 and a server 104. These components may be coupled together via network 106. Network 106 may comprise one or more networks, such as a local area network, or wide area network. In addition, network 106 may support a wide variety of known protocols, such as the transport control protocol and Internet protocol ("TCP/IP") and hypertext transport protocol ("HTTP").

The components of system 100 may be implemented on separate devices or may be implemented on one or more of the same devices or systems. For example, system 100 may have one or more of its components implemented on multiple machines that run different operating systems. Some of the specific components of system 100 will now be described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation. One skilled in the art will also recognize that client 102 may be implemented with various peripheral devices, such as a display, one or more speakers, and other suitable devices that are capable of providing feedback information to a user. Client 102 may also be implemented with various peripherals for accepting input from a user, such as a keyboard, a mouse, and the like. Although FIG. 1 shows a single client, system 100 may include any number of clients.

Server 104 stores, manages, and provides access control to items requested by client 102. For example, server 104 may process requests to retrieve an object, document, image file, web page, and the like. Server 104 may be implemented using a variety of devices and software. For example, server 104 may be a computer that runs one or more application programs and stored procedures under an operating system, such as LINUX, Windows, or Solaris.

FIG. 2 illustrates a server that is consistent with the present invention. As shown, server 104 may include a central processor 200, a cache 202, a main memory 204, a local storage device 206, and an input/output controller 208. These components may be implemented based on hardware and software that is well known to those skilled in the art.

Processor 200 may include cache 202 for storing frequently accessed information. Cache 202 may be an "on-chip" cache or external cache. Server 104 may also be provided with additional peripheral devices, such as a keyboard, mouse, or printer (not shown). In the embodiment shown, the various components of server 104 communicate through a system bus 210 or similar architecture.

Although FIG. 2 illustrates one example of the structure of server 104, the principles of the present invention are applicable to other types of processors and systems. For example, server 104 may comprise multiple processors, such as those provided by the Intel Corporation, or may comprise multiple computers that are linked together.

FIG. 3 illustrates an exemplary functional architecture for server 104 that is consistent with the present invention. As shown, server 104 may include an operating system ("OS") 300, a user interface 302, a password manager 304, and a password database 306. These components may be implemented as software, firmware, or some combination of both, which may be loaded into memory 204 of server 104. The software components may be written in a variety of programming languages, such as C, C++, Java, etc.

OS 300 is an integrated collection of routines that service the sequencing and processing of programs and applications by server 104. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, Open VMS, GNU/LINUX, AIX by IBM, Java and Sun Solaris by Sun Microsystems, and the Windows family of operating systems by Microsoft Corporation.

Interface 302 provides a communications interface between server 104 and client 102. For example, interface 302 may be configured to provide information that indicates the status of a proposed password that is being entered at client 106. Such communications may be based on well known protocols and programming languages, such as TCP/IP and Java. Interfaces like interface 302 may be implemented using well known Internet technologies, such as web pages, which are well known to those skilled in the art.

Password manager 304 provides the logic for analyzing and managing the passwords proposed at client 106. For example, password manager 304 may be configured to randomly retrieve one or more rules for a password, provide information that indicates these rules, and determine the status of a proposed password. As noted, password manager 304 may be written in a variety of programming languages, such as C, C++, Java, etc. and executed by server 104. In other embodiments, one or more of the functions of password manager 304 may be implemented as program code running on client 102.

Password database 306 provides storage and retrieval for the password data and the various rules that govern passwords. Password database 306 may be implemented using well known database technology, such as relational databases, or object oriented databases.

One skilled in the art will recognize that FIGS. 1-3 merely illustrate some embodiments of the present invention. For example, embodiments of the present invention may be implemented as software that is installed on a single computer. In other embodiments, server 104 may be configured as a central password authority to ensure that all clients, such as client 102, adhere to the same password rules.

Reference will now be made to FIGS. 4-5 to illustrate an exemplary process and display that are consistent with the present invention. As noted, the process and display illustrated in FIGS. 4-5 may be implemented using client 102, a programmed computer or other processing device. The program code may be stored on a storage medium, such as a compact disk, diskette, or any other suitable storage medium.

FIG. 4 illustrates a process flow for entering a strong password. In stage 400, one or more requirements for the password are randomly selected and provided. Password manager 304 may be triggered to begin its operations based on a number of events. For example, password manager 304 may be triggered in response to a request from client 102. Alternatively, password manager 304 may be triggered based on a time interval. For example, password manager 304 may be configured to require a new password at least once a month or once a year.

Password manager 304 may select one or more rules from password database 306 in various ways. For example, password database 306 may contain a large number of available rules for governing passwords and each rule may be assigned a unique identifier. Password manager 304 may then retrieve one or more of these rules from password database 306 by selecting the appropriate unique identifiers. In some embodiments, password manager 304 may select a rule randomly one at a time. That is, password manager 304 may select each rule independently of each other. Alternatively, password manager 304 may randomly select a group of rules. For example, password manager 304 may be configured to support multiple types or classes of users such that some users may require higher levels of security. Accordingly, password manager 304 may retrieve and randomly select different groups of password rules for different classes of users.

Generally, password manager 304 may assist users in creating strong passwords by guiding the users in entering "random" characters for the password. In order to accomplish this, password manager 304 may be configured to provide its rules for a password in a random sequence either individually or in a group. For example, if a particular password is required to contain at least one capital letter and at least one numerical character, password manager 304 may provide these rules to the user in a random order. Otherwise, the user may be tempted to simply enter a password with a capital letter followed by a number as part of the password. However, if the user is randomly prompted first to enter a number and then a capital letter, the user is likely to respond in kind and enter the characters in a fashion that mimics the random order, which may eventually lead to a stronger password.

In addition, password manager 304 may also be configured to provide various rules for when users are changing from a previous password. For example, password manager 304 may randomly select one or more rules that specify the extent to which a new password must differ from a previous password.

Once it has selected the applicable rules, password manager 304 may provide the rules to client 102, for example, via interface 302. Password manager 304 may provide the applicable rules in the form of text or other type of information, such as extensible markup language data. Subsequently, client 102 may then provide the applicable password rules to the user. For example, client 102 may provide the password rules using a dialog window or other suitable graphical user interface. In order to assist the user, client 102 may display the rules one at a time or in the form of a list.

In stage 402, characters for the password are received and it is determined whether the characters satisfy the requirements. In particular, a user at client 102 may commence entering characters for a proposed password. Client 102 may then analyze these characters to determine if they satisfy the rules received from password manager 302. Client 102 may be configured to continuously analyze the entered characters one at a time or in sets. For example, client 102 may be configured to buffer a number of characters and then analyze whether this group of characters assists in satisfying one or more rules. The number of characters buffered may be configured by client 102 or may be directed by password manager 302.

In some embodiments, client 102 continuously evaluates the characters as they are entered by the user against the applicable password rules. Client 102 may perform this analysis alone or in conjunction with server 104. For example, when a user enters a character, client 102 may determine if a selected rule has been satisfied in real time.

In stage 404, as the user enters characters for the password, client 102 may provide feedback to the user regarding the status of satisfying the password rules. For example, client 102 may highlight a rule or display a visual indicator, such as a check mark or "X", to indicate that the recently entered character was sufficient to satisfy one or more rules. Conversely, client 102 may provide feedback when the characters entered fail to satisfy one or more rules. Client 102 may also provide other forms of feedback, such as an audible tone, to the user as characters are entered for a password.

Accordingly, client 102 may be configured to provide effective feedback to the user as to the status of their proposed password. Client 102 may continuously provide the feedback visually or audibly, for example, after each character has been entered.

In some embodiments, the user may then confirm that their proposed password satisfies all of the rules provided. For example, client 102 may provide a dialog window with a button that the user selects to confirm they have completed entering a proposed password. Client 102 may then perform a final analysis of the entered password. This analysis may be performed by client 102 alone or in conjunction with server 104.

FIG. 5 shows an exemplary display screen that is consistent with the present invention. As shown, check marks are displayed next to various rules as the user has entered characters for a password. In the example shown, the rules have been selected and displayed in a random order (from top to bottom) to assist the user. Of course, one skilled in the art will recognize that other types of displays and windows may be used in embodiments of the present invention.

Other embodiments of the invention will be apparent to those skilled in the art from consideration of the specification and practice of the invention disclosed herein. It is intended that the specification and examples be considered as exemplary only.

What is claimed is:

1. A method comprising:
   randomly selecting, by a processor executing a password manager, a first requirement and a second requirement for creating a password from a set of requirements, wherein the second requirement is selected independently of the first requirement;
   providing a first indication of the first requirement for creating the password;
   receiving one or more characters for the password;
   providing information that indicates whether the one or more characters satisfy the first requirement; and
   providing, by the processor, a second indication of the second requirement for creating the password in response to the one or more characters satisfying the first requirement.

2. The method of claim 1, wherein providing information that indicates whether the one or more characters satisfy the first requirement comprises determining whether the one or more characters satisfy the first requirement as each of the one or more characters are received.

3. The method of claim 1, wherein providing information that indicates whether the one or more characters satisfy the first requirement comprises:
   buffering a set of received characters; and
   determining whether the set of received characters satisfy the first requirement.

4. The method of claim 1, wherein providing information that indicates whether the one or more characters satisfy the first requirement comprises providing information that indicates the one or more characters fail to satisfy the first requirement.

5. The method of claim 1, wherein providing information that indicates whether the one or more characters satisfy the first requirement comprises providing information that indicates the first requirement when the one or more characters fail to satisfy the first requirement.

6. The method of claim 1, further comprising:
   receiving one or more additional characters for the password;
   randomly selecting a plurality of additional requirements from the set of requirements; and
   providing one or more of the plurality of additional requirements in response to at least one of the one or more characters or the one or more additional characters satisfying the second requirement.

7. The method of claim 1, further comprising:
   retrieving the first requirement and the second requirement from a database.

8. A non-transitory computer readable medium containing instructions that, when executed by a processor, cause the processor to perform operations comprising:
   randomly selecting, by the processor, a first requirement and a second requirement from a set of requirements, wherein the second requirement is selected independently of the first requirement;
   providing a first indication of the first requirement for creating the password;
   receiving one or more characters for the password;
   providing information that indicates whether the one or more characters satisfy the first requirement; and
   providing, by the processor, a second indication of the second requirement for creating the password in response to the one or more characters satisfying the first requirement.

9. The non-transitory computer readable medium of claim 8, wherein providing information that indicates whether the one or more characters satisfy the first requirement comprises determining whether the one or more characters satisfy the first requirement as each of the one or more characters are received.

10. The non-transitory computer readable medium of claim 8, wherein providing information that indicates whether the one or more characters satisfy the first requirement comprises:
    buffering a set of received characters; and
    determining whether the set of received characters satisfy the first requirement.

11. The non-transitory computer readable medium of claim 8, wherein providing information that indicates whether the one or more characters satisfy the first requirement comprises providing information that indicates the one or more characters fail to satisfy the first requirement.

12. The non-transitory computer readable medium of claim 8, wherein providing information that indicates whether the one or more characters satisfy the first requirement comprises providing information that indicates the first requirement when the one or more characters fail to satisfy the first requirement.

13. The non-transitory computer readable medium of claim 8, the operations further comprising:
    receiving one or more additional characters for the password;
    randomly selecting a plurality of additional requirements from the set of requirements; and
    providing one or more of the plurality of additional requirements in response to at least one of the one or more characters or the one or more additional characters satisfying the second requirement.

14. The non-transitory computer readable medium of claim 8, the operations further comprising:
    retrieving the first requirement and the second requirement from a database.

15. A computer comprising:
    a memory to store instructions for a password manager; and
    a processor, coupled to the memory, to execute the instructions, wherein the processor is to:
        randomly select a first requirement and a second requirement for creating a password from a set of requirements, wherein the second requirement is selected independently of the first requirement;
        provide a first indication of the first requirement for creating the password;
        receive one or more characters for the password;
        provide information that indicates whether the one or more characters satisfy the first requirement; and
        provide a second indication of the second requirement for creating the password in response to the one or more characters satisfying the first requirement.

16. The computer of claim 15, wherein providing information that indicates whether the one or more characters satisfy the first requirement comprises determining whether the one or more characters satisfy the first requirement as each of the one or more characters are received.

17. The computer of claim 15, wherein providing information that indicates whether the one or more characters satisfy the first requirement comprises:
    buffering a set of received characters; and
    determining whether the set of received characters satisfy the first requirement.

18. The computer of claim 15, wherein providing information that indicates whether the one or more characters satisfy the first requirement comprises providing information that indicates the one or more characters fail to satisfy the first requirement.

19. The computer of claim 15, wherein providing information that indicates whether the one or more characters satisfy the first requirement comprises providing information that indicates the first requirement when the one or more characters fail to satisfy the first requirement.

20. The computer of claim 15, wherein the processor is further to:
    receive one or more additional characters for the password;
    randomly select a plurality of additional requirements from the set of requirements; and
    provide one or more of the plurality of additional requirements in response to at least one of the one or more characters or the one or more additional characters satisfying the second requirement.

* * * * *